(12) United States Patent
Gilman

(10) Patent No.: US 7,979,920 B2
(45) Date of Patent: Jul. 19, 2011

(54) HEADWEAR WITH INTEGRAL EYEGLASS SECURING APPARATUS

(76) Inventor: Jeff Gilman, New Braunfels, TX (US)

( * ) Notice: Subject to any disclaimer, the term of this patent is extended or adjusted under 35 U.S.C. 154(b) by 341 days.

(21) Appl. No.: 12/380,060

(22) Filed: Feb. 23, 2009

(65) Prior Publication Data

US 2010/0212066 A1    Aug. 26, 2010

(51) Int. Cl.
 *A42B 1/24* (2006.01)
(52) U.S. Cl. .......... 2/195.1; 2/209.13
(58) Field of Classification Search ........... 2/171, 175.1, 2/13, 918, 195.1, 209.13, 209.14, 209.12; 351/155, 52

See application file for complete search history.

(56) References Cited

U.S. PATENT DOCUMENTS

| | | | |
|---|---|---|---|
| 264,574 A | 9/1882 | Shone | |
| 4,179,753 A * | 12/1979 | Aronberg et al. | 2/10 |
| 4,387,471 A | 6/1983 | Hsu et al. | |
| 5,082,225 A | 1/1992 | Nespoli | |
| 5,491,842 A * | 2/1996 | Braswell-Moore | 2/10 |
| 5,567,038 A * | 10/1996 | Lary | 362/106 |
| 5,647,061 A * | 7/1997 | Marcus | 2/11 |
| 5,740,557 A | 4/1998 | Reid | |
| 5,860,167 A * | 1/1999 | Lizio | 2/209.13 |
| 5,996,116 A | 12/1999 | Tate | |
| 6,163,889 A | 12/2000 | Tate | |
| 6,185,748 B1 * | 2/2001 | DeChambeau | 2/195.1 |
| 6,298,495 B1 * | 10/2001 | Totani | 2/209.13 |
| 6,314,583 B1 * | 11/2001 | Cho | 2/195.1 |
| D453,608 S * | 2/2002 | Park | D2/866 |
| D455,247 S * | 4/2002 | DeChambeau | D2/866 |
| 6,481,059 B2 | 11/2002 | Morris | |
| 6,481,060 B1 * | 11/2002 | Tsai | 24/3.12 |
| 6,611,959 B1 * | 9/2003 | Lando | 2/10 |
| 6,637,074 B1 | 10/2003 | Morris | |
| 6,644,807 B1 | 11/2003 | Hood | |
| 6,647,554 B1 * | 11/2003 | Yan | 2/209.13 |
| 6,668,426 B1 * | 12/2003 | Morris | 24/3.3 |
| 6,671,885 B2 * | 1/2004 | Viggiano | 2/209.13 |
| 6,792,619 B1 * | 9/2004 | Morris et al. | 2/10 |
| 6,916,094 B1 | 7/2005 | Altabeb | |
| 6,935,742 B1 | 8/2005 | Wilson | |
| 6,938,273 B2 * | 9/2005 | Ko | 2/10 |
| 7,255,436 B2 * | 8/2007 | Tracy | 351/155 |
| 7,275,270 B2 * | 10/2007 | Cotutsca | 2/209.13 |
| 7,296,889 B2 | 11/2007 | Dietz | |
| 7,470,022 B2 * | 12/2008 | Lerner | 351/155 |
| 7,484,845 B2 * | 2/2009 | Douglas | 351/155 |
| 7,761,928 B2 * | 7/2010 | Wang | 2/10 |
| 7,866,813 B2 * | 1/2011 | Anhalt | 351/155 |
| 2005/0132461 A1 * | 6/2005 | Koo | 2/12 |
| 2006/0005299 A1 * | 1/2006 | Lerner | 2/209.13 |
| 2007/0229759 A1 | 10/2007 | Jones | |

* cited by examiner

*Primary Examiner* — Danny Worrell
(74) *Attorney, Agent, or Firm* — David O. Simmons

(57) ABSTRACT

A sports-type cap comprises a crown structure and a bill attached at its first edge portion to a crown structure's lower edge portion. A fabric strap is secured at its first end portion within an interface between the crown structure and the bill, and extends outwardly from the interface over the bill's upper surface. A first magnet is attached to a second end portion of the fabric strap. A second magnet is attached to the bill adjacent its second edge portion. A third magnet is attached to the crown structure at a location above the interface. The magnets are jointly positioned and configured to allow the first magnet to be selectively engaged with/disengaged from the second magnet for securing the fabric strap in a stowed orientation and to allow the first magnet to be selectively engaged with/disengaged from the third magnet for securing the fabric strap in an eyeglass-securing orientation.

17 Claims, 3 Drawing Sheets

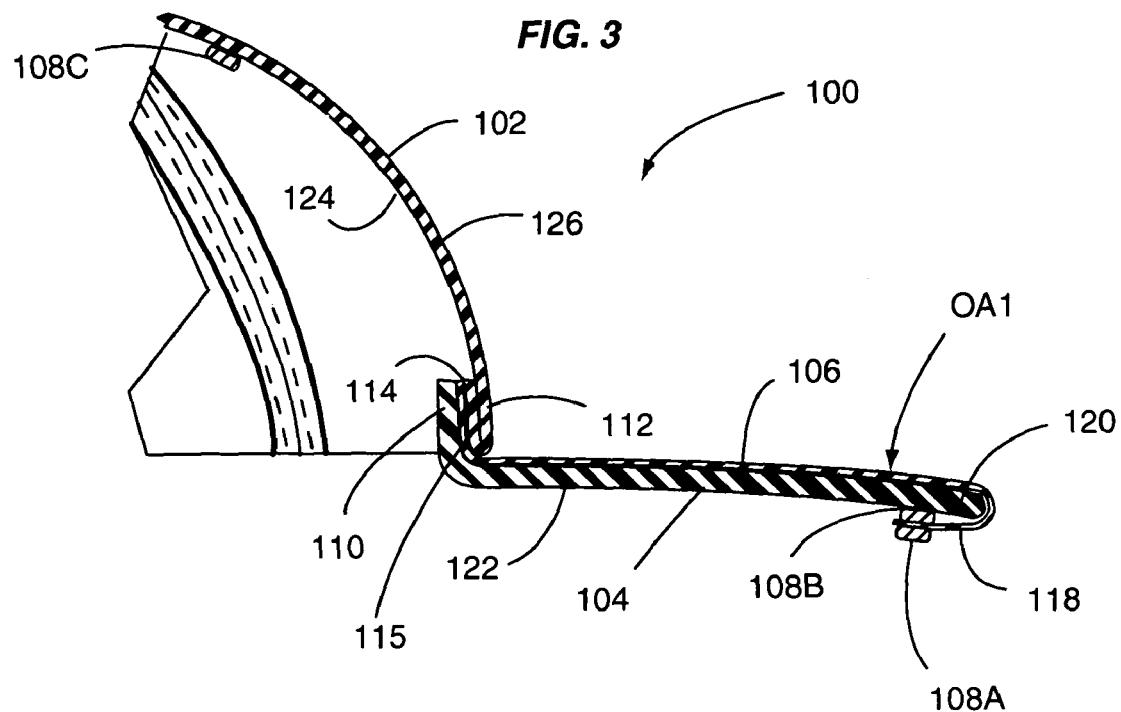
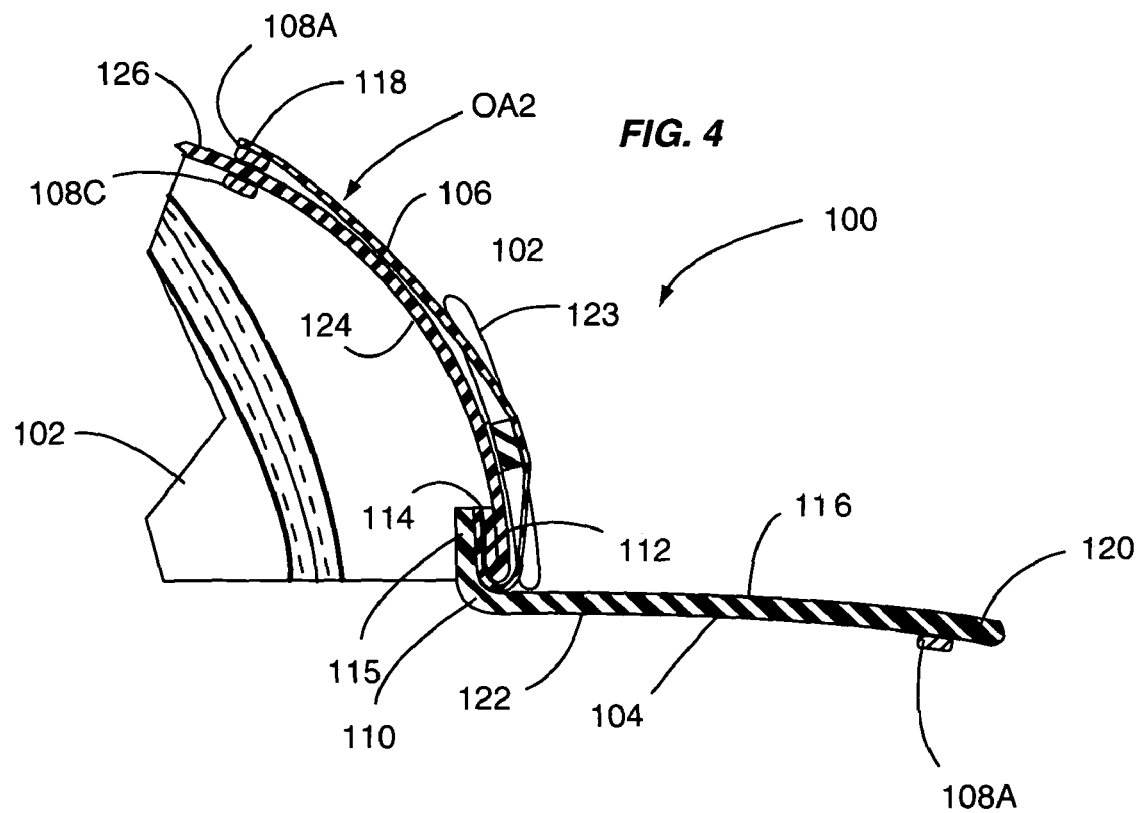

US 7,979,920 B2

HEADWEAR WITH INTEGRAL EYEGLASS SECURING APPARATUS

FIELD OF THE DISCLOSURE

The disclosures made herein relate generally to hats, caps and other types of headwear and, more particularly, to headwear with integral eyeglass securing apparatus.

BACKGROUND

Countless numbers of people wear eyeglasses everyday. Examples of such eyeglasses include, but are not limited to, prescription eyeglasses, sunglasses, safety glasses and the like. However, for various reasons, many people remove their eyeglasses during the course of the day. For example, during certain sports activities such as fishing and golfing, there is often the need to for a person to repeatedly remove and replace their eyeglasses. Furthermore, in many situations, the person often requires a place to temporarily store their eyeglasses when the eyeglasses are removed so that they can freely make used of both hands.

As is well known, a brim or bill of headwear can make for a convenient place for a person to temporarily store their eyeglasses. In the typical case, the lens portion of the eyeglasses rests on the brim or bill with the arms of the eyeglasses extending on opposing sides of a crown structure of the headwear. The problem that often arises is that abrupt movement of the body and/or leaning over causes the eyeglasses to slide off the headwear. Quite often, this can result in the eyeglasses becoming lost or damaged, in an unsafe condition if the person becomes distracted by the eyeglasses falling off the headwear, or in other undesirable situations.

SUMMARY OF THE DISCLOSURE

The present invention provides a simple yet effective means for securing eyeglasses to headwear. Furthermore, such securing (and de-securing) can be rapidly carried out and can be carried out using one hand. Thus, the present invention is beneficial, desirable and useful.

In one embodiment of the present invention, a headwear article comprises a crown assembly, a shadow casting assembly and a strap assembly. The crown assembly is configured to fit on a person's head. The shadow casting assembly is attached at a first edge portion thereof to a lower edge portion of the crown assembly and extends outwardly from the crown assembly. The strap assembly is attached at a first end portion thereof to at least one of the crown assembly and the shadow casting assembly. The first end portion of the strap assembly is attached adjacent an interface between the crown assembly and the shadow casting assembly and extends over an upper surface of the shadow casting assembly toward a second edge portion of the shadow casting assembly. The strap assembly and the shadow casting assembly are jointly configured to allow a second end portion of the strap assembly to be selectively engaged with and disengaged from the shadow casting assembly for securing the strap assembly in a stowed orientation. The strap assembly and the crown assembly are jointly configured to allow the second end portion of the strap assembly to be selectively engaged with and disengaged from the crown assembly for securing the strap assembly in an eyeglass securing orientation.

In another embodiment of the present invention, a headwear article comprises a crown structure, a shadow casting structure, a strap, and a plurality of fastening structures. The crown structure is configured to fit on a person's head. The shadow casting structure is attached at a first edge portion thereof to a lower edge portion of the crown structure and extends outwardly from the crown structure. The strap is secured at a first end portion thereof within an interface between the crown structure and the shadow casting structure. The strap extends over an upper surface of the shadow casting structure toward a second edge portion of the shadow casting structure. A first fastening structure is attached to a second end portion of the strap. A second fastening structure is attached to the shadow casting portion at a location between said first and second edge portions of the shadow casting structure. A third fastening structure is attached to the crown structure at a location above the lower edge portion thereof. The fastening structures are jointly positioned and configured to allow the first fastening structure to be selectively engaged with and disengaged from the second fastening structure for securing the strap in a stowed orientation and to allow the first fastening structure to be selectively engaged with and disengaged from the third fastening structure for securing the strap in an eyeglass securing orientation.

In another embodiment of the present invention, a sports-type cap comprises a crown structure, a bill, a fabric strap and a plurality of magnets. The crown structure is configured to fit on a person's head. The bill is attached at a first edge portion thereof to a lower edge portion of the crown structure and extends outwardly from the crown structure. The fabric strap is secured at a first end portion thereof within an interface between the crown structure and the bill. The fabric strap extends outwardly from the interface over an upper surface of the bill. A first magnet is attached to a second end portion of the fabric strap. A second magnet is attached to the bill at a location adjacent a second edge portion of the bill. A third magnet is attached to the crown structure at a location above the interface between the crown structure and the bill. The magnets are jointly positioned and configured to allow the first magnet to be selectively engaged with and disengaged from the second magnet for securing the fabric strap in a stowed orientation and to allow the first magnet to be selectively engaged with and disengaged from the third magnet for securing the fabric strap in an eyeglass securing orientation.

These and other objects, embodiments, advantages and/or distinctions of the present invention will become readily apparent upon further review of the following specification, associated drawings and appended claims.

BRIEF DESCRIPTION OF THE DRAWINGS

FIG. 3 is a cross-sectional view taken along the line 3-3 in FIG. 2.

FIG. 4 is a cross sectional view taken along the line 4-4 in FIG. 1.

DETAILED DESCRIPTION OF THE DRAWING FIGURES

Figure 1:
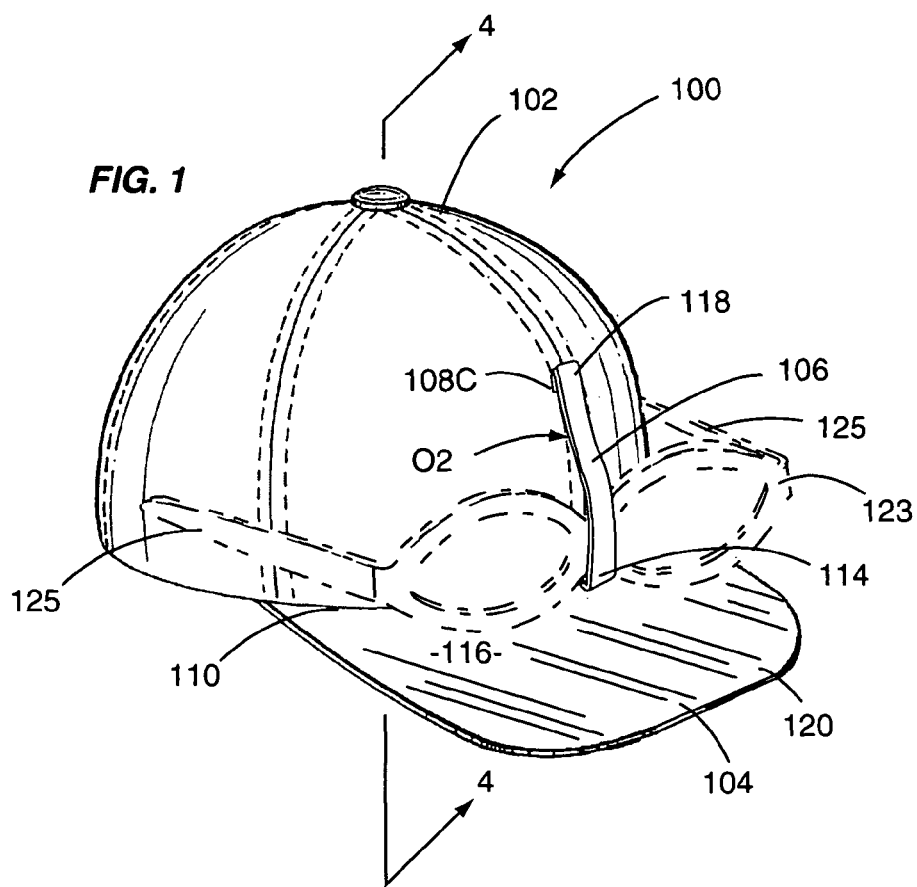
FIG. 1 shows a first embodiment of a headwear article configured in accordance with the present invention, wherein a strap assembly thereof is in an eyeglass securing orientation.
Figure 2:
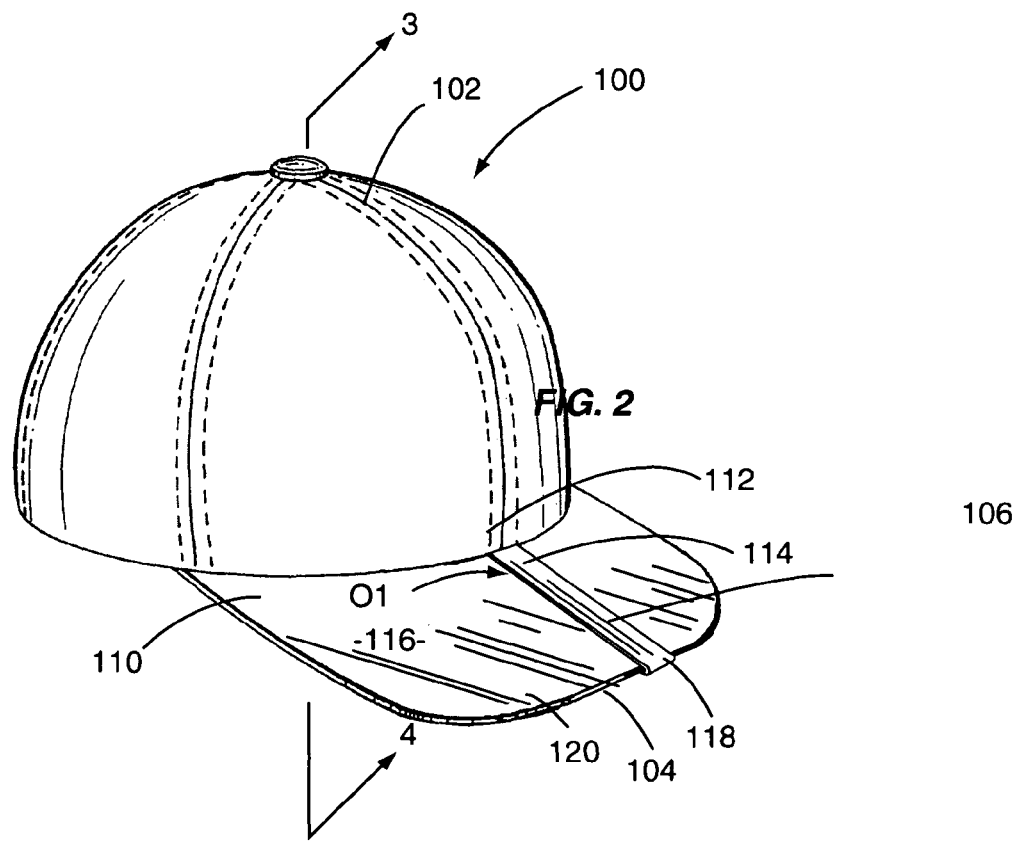
FIG. 2 shows the headwear article of FIG. 1 with the strap assembly thereof in a stowed orientation.

Referring to FIGS. 1-4, a headwear article 100 configured in accordance with a first embodiment of the present invention is shown. As configured, the headwear article 100 provides a simple yet effective means for securing eyeglasses thereto. Furthermore, such securing (and de-securing) can be rapidly carried out and can be carried out using one hand. Thus, headwear configured in accordance with the present invention is beneficial, desirable and useful.

As shown, the headwear article 100 is a sports-type cap (i.e., also commonly referred to as a baseball cap). Such a sports-type cap is one example of a headwear article that can be configured in accordance with the present invention. Other types of headwear articles that can be configured in accordance with the present invention include, but are not limited to, brimmed hats, brimmed caps, billed visors and the like.

The headwear article 100 includes a crown structure 102, bill 104, a strap 106, and a plurality of magnets 108A, 108B, 108C. The crown structure 102 configured to fit on a person's head. The bill 104 is attached at a first edge portion 110 thereof to a lower edge portion 112 of the crown structure 102. The bill structure 104 can be attached to the crown structure 102 by any suitable means (e.g., sewn thread, adhesive or the like). The crown structure and the bill are jointly configured and connected in a manner whereby the bill 104 extends outwardly from the crown structure 102. In this manner, the bill serves as a shadow casting structure. Brims and the like are other examples of shadow casting structure commmonly found on headwear articles such as hats.

The strap 108 is secured at a first end portion 114 thereof within an interface 115 between the crown structure 102 and the bill 104. The strap 106 extends outwardly from the interface over an upper surface 116 of the bill 104. Optionally, the strap 108 can be attached to the crown structure 102 or the bill 104 at a location adjacent to the interface 115. Preferably, but not necessarily, the strap 106 is flexible and/or conformable (e.g., made from a flexible and/or conformable material such as fabric, plastic sheet or the like).

A first magnet 108A (i.e., a first fastening structure) is attached to a second end portion 118 of the strap 106. A second magnet 108B (i.e., a second fastening structure) is attached to the bill 104 at a location adjacent a second edge portion 120 of the bill 104. A third magnet 108C (i.e., a third fastening structure) is attached to the crown structure 102 at a location above the interface between the crown structure 102 and the bill 104. It is disclose herein that a strap assembly in accordance with the present invention includes the strap 106 and the first magnet 108A, that a shadow casting assembly in accordance with the present invention includes the bill 104 and the second magnet 108B, and that a crown assembly in accordance with the present invention includes the crown structure 102 and the third magnet 108C. The magnets 108a, 108B and 108C are examples of respective fastening structures, which can be attached to the respective portion of the cap 100 by any suitable means (e.g., adhesive, sewn thread, overlying patch of material, etc). It is disclosed herein that strap assemblies, shadow casting assemblies and crown assemblies in accordance with the present invention can include fastening structures different than magnets.

The magnets 108A, 108B, 108C are jointly positioned and configured to allow the first magnet 108A to be selectively engaged with and disengaged from the second magnet 108B for securing the strap 106 in a stowed orientation O1 and to allow the first magnet 108A to be selectively engaged with and disengaged from the third magnet 108C for securing the strap 106 in an eyeglass securing orientation O2. In the eyeglass securing position O2, eyeglasses 123 are secured in place (e.g., resting on the bill 104 with the arms 125 thereof extending on opposing sides of the crown structure 102). As such, it can be seen that the second magnet 108B is attached to a lower surface 122 of the bill 104 and the third magnet 108C is attached to the an interior surface 124 of the crown structure 102. A length of the strap 106 is sufficient for allowing first magnet 108A to engage the second magnet 108B and the third magnet 108C at their respective locations of attachment. Alternatively, the second magnet 108B can be attached to the upper surface 116 of the bill 104 and the third magnet 108C can be attached to the an exterior surface 126 of the crown structure 102.

The magnets 108A, 108B, 108C being jointly positioned and configured also includes the magnets 108A, 108B 108C being arranged such that the magnetic fields of two engaged magnets are in an attracting configuration as opposed to a retracting configuration. Accordingly, to allow the first magnet 108A to be selectively engaged with and disengaged from the second magnet 108B for securing the strap 106 in the stowed orientation O1, the opposite poles of the first magnet 108A and the second magnet 108B are adjacent each other during their engagement and with the strap 106 in non-twisted configuration. For example, the north pole of first magnet 108A is adjacent the south pole of second magnet 108B or the south pole of first magnet 108A is adjacent the north pole of second magnet 108B. Similarly, to allow the first magnet 108A to be selectively engaged with and disengaged from the third magnet 108C for securing the strap 106 in the eyeglass securing orientation O2, the opposite poles of the first magnet 108A and the third second magnet 108C are adjacent each other during their engagement and with the strap 106 in non-twisted configuration. For example, the north pole of first magnet 108A is adjacent the south pole of the third magnet 108C or the south pole of first magnet 108A is adjacent the north pole of second magnet 108C.

Figure 5:
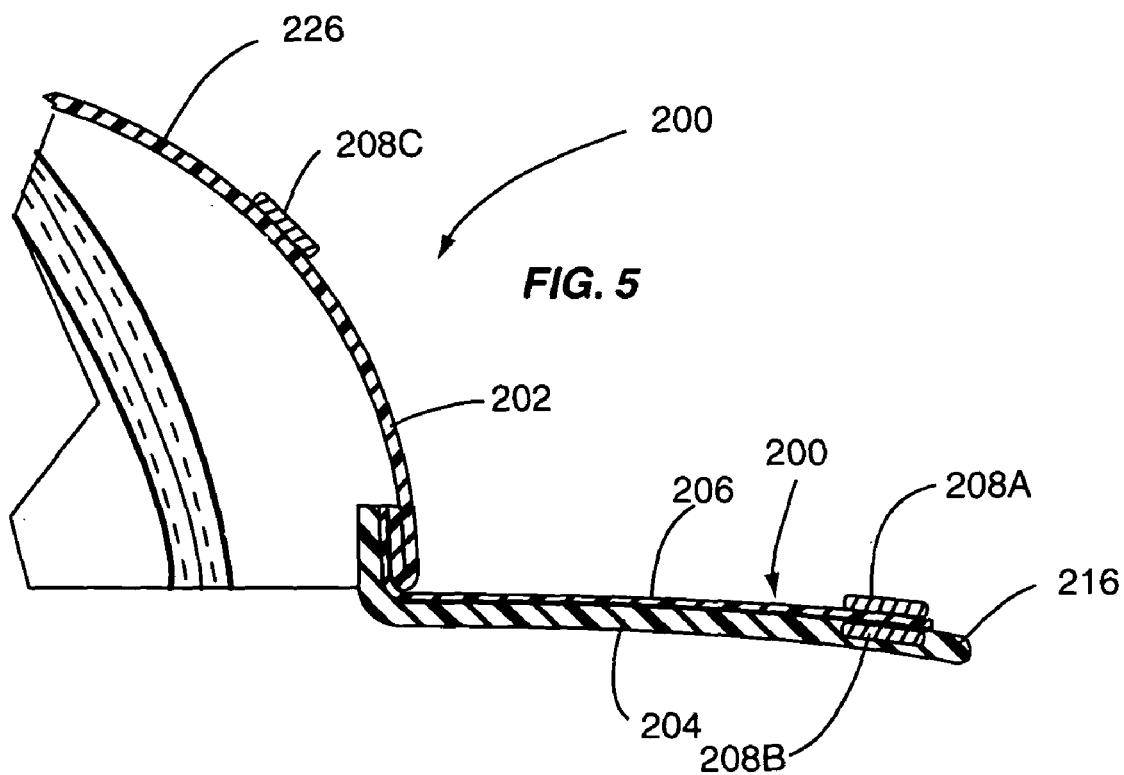
FIG. 5 shows a second embodiment of a headwear article configured in accordance with the present invention, wherein a strap assembly thereof is in a stowed securing orientation.

Referring now to FIG. 5, a headwear article 200 configured in accordance with a second embodiment of the present invention is shown. The overall configuration of the headwear article 200 is the same as that of the headwear article 100, whereby common structural elements will use the same reference name and different numeric designation. Key differences are that the second magnet 208B is attached to the exterior surface 226 of the crown structure 202, the third magnet 208C is embedded within the upper surface 216 of the bill 204, and the length of the strap 206 being reduced accordingly.

It is disclosed herein that, for embodiments that rely on magnet field for securing the strap in the stowed and eyeglass securing orientations, fewer than three of the fastening structures need to be magnets. In one such embodiment, the first fastening structure (i.e., attached to the strap) includes only substantially non-magnetized materials (e.g., non-magnetized steel) and the second and third fastening structures (i.e., attached to the shadow casting structure and crown structure, respectively) each include a magnet. In another such embodiment, the first fastening structure (i.e., attached to the strap) includes a magnet and the second and third fastening structures (i.e., attached to the shadow casting structure and crown structure, respectively) each include only substantially non-magnetized materials (e.g., non-magnetized steel).

Figure 6:
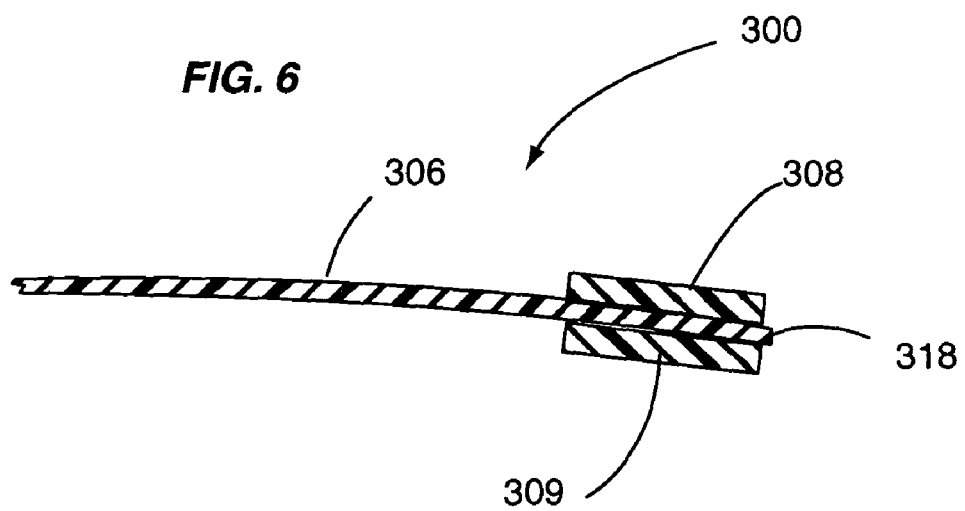
FIG. 6 shows a strap assembly including mechanical fastening structures.

It is disclosed herein that each fastening structure in accordance with the present invention can be a respective portion of a hook-loop fastening system, mechanical snap system, or the like. For example, as shown in FIG. 6, a strap assembly 305 includes a strap 306 with mechanical fastening structures 308, 309 (e.g., hook structures) attached to opposing sides thereof at its second end portion 318. Mating mechanical fastening structures (e.g., loop structure) are-attached to the crown structure and shadow casting structure of a corresponding headwear article (e.g., in place of the second magnet 208B and third magnet 208C of the headwear article 200 shown in FIG. 5).

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A headwear article, comprising:
   a crown assembly configured to fit on a person's head;
   a shadow casting assembly attached at a first edge portion thereof to a lower edge portion of the crown assembly, wherein the shadow casting structure extends outwardly from the crown assembly; and
   a strap assembly attached at a first end portion thereof to at least one of the crown assembly and the shadow casting assembly, wherein the first end portion of the strap assembly is attached adjacent an interface between the crown assembly and the shadow casting assembly and extends over an upper surface of the shadow casting assembly toward a second edge portion of the shadow casting assembly;
   wherein the strap assembly and the shadow casting assembly are jointly configured to allow a second end portion of the strap assembly to be selectively engaged with and disengaged from the shadow casting assembly for securing the strap assembly in a stowed orientation; and
   wherein the strap assembly and the crown assembly are jointly configured to allow the second end portion of the strap assembly to be selectively engaged with and disengaged from the crown assembly for securing the strap assembly in an eyeglass securing orientation;
   wherein the shadow casting assembly includes a bill;
   wherein the bill defines the upper surface, first edge portion and the second edge portion of the shadow casting assembly;
   wherein the bill is attached to a crown structure of the crown assembly;
   wherein the strap assembly includes a first fastening structure attached to the second end portion thereof;
   wherein the bill includes a second fastening structure attached thereto;
   wherein the crown structure includes a third fastening structure attached thereto;
   wherein the first fastening structure is configured for being selectively engaged with and disengaged from said first and second fastening structures.

2. The headwear article of claim 1 wherein the strap assembly is secured at a first end portion thereof within an interface between the crown assembly and the shadow casting assembly.

3. The headwear article of claim 1 wherein:
   the second fastening structure is attached to one of the upper surface and a lower surface of the bill;
   the third fastening structure is attached to one of an interior surface and an exterior surface of the crown structure.

4. The headwear article of claim 3 wherein each one of said fastening structures includes a magnet.

5. The headwear article of claim 4 wherein:
   the second fastening structure is attached to the lower surface of the bill;
   the third fastening structure is attached to the interior surface of the crown structure.

6. The headwear article of claim 5 wherein a length of the strap assembly is sufficient for allowing first fastening structure to engage the second fastening structure from a lower surface of the bill.

7. The headwear article of claim 3 wherein one of:
   the first fastening structure includes only substantially non-magnetized materials and said second and third fastening structures each include a magnet; and
   the first fastening structure includes a magnet and said second and third fastening structures each include only substantially non-magnetized materials.

8. A headwear article, comprising:
   a crown structure configured to fit on a person's head;
   a shadow casting structure attached at a first edge portion thereof to a lower edge portion of the crown structure, wherein the shadow casting structure extends outwardly from the crown structure;
   a strap secured at a first end portion thereof within an interface between the crown structure and the shadow casting structure, wherein strap extends over an upper surface of the shadow casting structure toward a second edge portion of the shadow casting structure;
   a first fastening structure attached to a second end portion of the strap;
   a second fastening structure attached to the shadow casting portion at a location between said first and second edge portions of the shadow casting structure; and
   a third fastening structure attached to the crown structure at a location above the lower edge portion thereof;
   wherein said fastening structures are jointly positioned and configured to allow the first fastening structure to be selectively engaged with and disengaged from the second fastening structure for securing the strap in a stowed orientation and to allow the first fastening structure to be selectively engaged with and disengaged from the third fastening structure for securing the strap in an eyeglass securing orientation.

9. The headwear article of claim 8 wherein:
   the second fastening structure is attached to one of the upper surface and a lower surface of the shadow casting structure;
   the third fastening structure is attached to one of an interior surface and an exterior surface of the crown structure.

10. The headwear article of claim 9 wherein each one of said fastening structures includes a magnet.

11. The headwear article of claim 10 wherein:
    the second fastening structure is attached to the lower surface of the shadow casting structure;
    the third fastening structure is attached to the interior surface of the crown structure.

12. The headwear article of claim 11 wherein a length of the strap is sufficient for allowing first fastening structure to engage the second fastening structure at the lower surface of the shadow casting structure.

13. The headwear article of claim 9 wherein one of:
the first fastening structure includes only substantially non-magnetized materials and said second and third fastening structures each include a magnet; and
the first fastening structure includes a magnet and said second and third fastening structures each include only substantially non-magnetized materials.

14. A sports-type cap, comprising:
a crown structure configured to fit on a person's head;
a bill attached at a first edge portion thereof to a lower edge portion of the crown structure, wherein the bill extends outwardly from the crown structure;
a fabric strap secured at a first end portion thereof within an interface between the crown structure and the bill, wherein the fabric strap extends outwardly from the interface over an upper surface of the bill;
a first magnet attached to a second end portion of the fabric strap;
a second magnet attached to the bill at a location adjacent a second edge portion of the bill; and
a third magnet attached to the crown structure at a location above the interface between the crown structure and the bill;
wherein said magnets are jointly positioned and configured to allow the first magnet to be selectively engaged with and disengaged from the second magnet for securing the fabric strap in a stowed orientation and to allow the first magnet to be selectively engaged with and disengaged from the third magnet for securing the fabric strap in an eyeglass securing orientation.

15. The cap of claim 14 wherein:
the second magnet is attached to one of the upper surface and a lower surface of the bill;
the third magnet is attached to one of an interior surface and an exterior surface of the crown structure.

16. The cap of claim 15 wherein:
the second fastening structure is attached to the lower surface of the shadow casting structure;
the third fastening structure is attached to the interior surface of the crown structure.

17. The cap of claim 16 wherein a length of the fabric strap is sufficient for allowing first fastening structure to engage the second fastening structure at the lower surface of the shadow casting structure.

* * * * *